US009043025B2

(12) United States Patent
Brooks et al.

(10) Patent No.: US 9,043,025 B2
(45) Date of Patent: May 26, 2015

(54) SYSTEMS AND METHODS FOR SAFE ROBOT OPERATION

(71) Applicants: Rodney Brooks, Cambridge, MA (US); Michael Sussman, Winchester, MA (US); Matthew Murray Williamson, Marblehead, MA (US); William A. Goodwin, Westwood, MA (US); Noelle Dye, Charlestown, MA (US); Bruce Blumberg, Concord, MA (US)

(72) Inventors: Rodney Brooks, Cambridge, MA (US); Michael Sussman, Winchester, MA (US); Matthew Murray Williamson, Marblehead, MA (US); William A. Goodwin, Westwood, MA (US); Noelle Dye, Charlestown, MA (US); Bruce Blumberg, Concord, MA (US)

(73) Assignee: Rethink Robotics, Inc., Boston, MA (US)

( * ) Notice: Subject to any disclaimer, the term of this patent is extended or adjusted under 35 U.S.C. 154(b) by 88 days.

(21) Appl. No.: 14/016,664

(22) Filed: Sep. 3, 2013

(65) Prior Publication Data

US 2014/0067121 A1 Mar. 6, 2014

Related U.S. Application Data

(60) Provisional application No. 61/695,443, filed on Aug. 31, 2012.

(51) Int. Cl.
*G05B 19/04* (2006.01)
*G05B 19/18* (2006.01)
*B25J 9/16* (2006.01)

(52) U.S. Cl.
CPC ..... *B25J 9/1676* (2013.01); *G05B 2219/40202* (2013.01); *G05B 2219/43202* (2013.01); *G05B 2219/40203* (2013.01)

(58) Field of Classification Search
CPC ............... G06F 3/04815; A61B 2562/0219; A61B 5/1122; A61B 5/22; B25J 9/1676; G05B 19/401; G05B 2219/40202; G05B 2219/40203; G05B 2219/43202
USPC .................................................. 700/245–264
See application file for complete search history.

(56) References Cited

U.S. PATENT DOCUMENTS

| 8,249,747 | B2 | 8/2012 | Kock |
| 8,315,735 | B2 | 11/2012 | Nihei et al. |
| 2011/0067521 | A1 | 3/2011 | Linn et al. |

(Continued)

FOREIGN PATENT DOCUMENTS

| DE | 10320343 A1 | 12/2004 |
| JP | 5035768 B2 | 7/2012 |

(Continued)

OTHER PUBLICATIONS

International Patent Application No. PCT/US2013/057809, International Search Report and Written Opinion mailed May 22, 2014, 8 pages.
Balan et al., "Real-time 3D Collision Avoidance Method for Safe Human and Robot Coexistence", Proceedings of the International Conference on Intelligent Robots and Systems, Oct. 9-15, 2006, p. 276.

(Continued)

*Primary Examiner* — Bhavesh V Amin
(74) *Attorney, Agent, or Firm* — Morgan, Lewis & Bockius LLP

(57) ABSTRACT

In various embodiments, safe collaboration between a robot and humans is achieved by operating the robot continuously at or below a first threshold speed at which any collisions with a person's arms do not cause harm, and, upon detection of the person's torso or head within a danger zone around the robot, reducing the speed to or below a second threshold at which any collisions with the person's torso or head do not cause harm.

21 Claims, 5 Drawing Sheets

(56) References Cited

U.S. PATENT DOCUMENTS

2011/0264266 A1 10/2011 Kock
2012/0022689 A1 1/2012 Kapoor
2012/0182392 A1 7/2012 Kearns et al.
2012/0303160 A1 11/2012 Ziegler et al.

FOREIGN PATENT DOCUMENTS

WO 2009/155947 A1 12/2009
WO 2014/036549 A2 3/2014
WO 2014/036549 A3 7/2014

OTHER PUBLICATIONS

Danica (Dana) Kulić "Safety for Human-Robot Interaction", The University of British Columbia, a Thesis Submitted in Partial Fulfilment of the Requirements for the Degree of Doctor of Philosophy in the Faculty of Graduate Studies, Mechanical Engineering, Dec. 2005, 188 pages.

Hamasaki et al., "Prediction of Human's Movement for Collision Avoidance of Mobile Robot", IEEE International Conference on Robotics and Biomimetics (ROBIO), Dec. 7-11, 2011, 6 pages.

Vasic et al., "Safety Issues in Human-Robot Interactions", Proceedings of the International Conference on Robotics and Automation, 2013, 8 pages.

SYSTEMS AND METHODS FOR SAFE ROBOT OPERATION

CROSS-REFERENCE TO RELATED APPLICATION

The present application claims priority to and the benefit of, and incorporates herein by reference in its entirety, U.S. Provisional Application No. 61/695,443, filed on Aug. 31, 2012.

TECHNICAL FIELD

The present invention relates to safety in robot operation, in particular, in situations where the robot and a human share the same workspace.

BACKGROUND

Safety during operation of conventional industrial robots is usually accomplished with external sensor systems that are triggered by dangerous conditions and, when triggered, command the robot to shut down or work at a drastically reduced speed. Typically, the sensors are arranged to detect persons entering a work zone of the robot. For example, the sensor system may consist of or include pressure-sensitive mats on the floor, continuous beams of light that get broken by somebody walking through them, or a scanning laser range finder (including appropriate perceptual processing functionality) that detects movement of people. The drawback of such systems is that the presence of people near the robot necessarily causes a slow-down in, or even dead-stop of, the robot's work. The result is a significant efficiency decrease, which is exacerbated by the need to define a wide danger zone around the robot in order to avoid safety risks to people. This constraint also prevents people from working in close proximity to, e.g., collaboratively with, a robot.

One alternative to this all-or-nothing approach is to compute and predict trajectories of various body parts of human bystanders and various parts of the robot, anticipating possible collisions, assessing the potential damage that an impact between a particular body part with a particular robot part could cause, and basing a more refined safety decision on that knowledge for example, slowing the robot down to a speed commensurate with the computed risk rather than shutting the robot off altogether. This approach, however, is challenging to implement in practice given the complexity and inherent uncertainty of the computations: it is difficult to sense exactly where a person's body parts are and to predict where they are headed, and even more difficult to model human injury vulnerability for collisions between different parts of the human body and robot parts of different mechanical shape and hardnesses. Yet any compromises or uncertainties in modeling accuracy will either undermine the safety of the system or defeat efficiency gains relative to the all-or-nothing approach.

Accordingly, it is desirable to provide systems and methods for robot safety that are straightforwardly implemented while avoiding unnecessary interruptions and retardations of robot operation.

SUMMARY

In general, the present invention provides approaches to robot safety that rely on straightforwardly implemented and unambiguous computational judgments and allow a robot working collaboratively with and/or in proximity to a person to operate at full speed whenever it is safe to do so. More specifically, in various embodiments, safe robot operation is achieved without unduly limiting operation speeds by utilizing at least two different safety limits: a lower, more stringent speed limit is set so as to avoid injury (and pain) in case of a collision between a person's torso or head and the robot, while a higher, more permissive speed limit is set to assure that collisions between a person's arms or hands (which are generally less sensitive) and the robot do not cause injury.

The lower speed limit is triggered when the robot's safety system detects entry of a person's torso and/or head into a danger zone around the robot; this zone may, for example, be defined as coextensive with the reach of the robot's appendages, i.e., with the robot's workspace. As long as the person's torso and head are outside the danger zone, the robot may operate at higher speeds. This allows a person to reach—from outside the danger zone—into the robot's workspace, e.g., to place new objects or materials for the robot or to retrieve finished objects or materials, while the robot operates at speeds above the lower speed limit. The higher speed limit, on the other hand, is never exceeded—it constitutes full speed; thus, under conditions compatible with the higher limit, reaching into the robot's workspace is intrinsically safe. This discrete (rather than continuously variable) approach to safety-related robot control balances the need to avoid injury with computational tractability and certainty.

Discrimination between the person's torso and head on the one hand, and his arms and hands on the other hand, may be achieved in several ways. In some embodiments, the sensor system detecting the person may be able to explicitly distinguish arms from the rest of the person's body, e.g., based on the analysis of camera images. In other embodiments, the arms are distinguished from the torso and head implicitly, e.g., by means of a configuration of the sensor system that inherently lets the arms go unnoticed. For example, in one embodiment, the detection zone (i.e., the spatial zone monitored by the sensors) is tailored—e.g., via a suitable arrangement of the sensors—to coincide with only a portion of the danger zone such that entry of a person's torso or head into the danger zone is ordinarily detected whereas the person's hands, even while in the danger zone, can fall outside the detection zone and, thus, escape detection. If the sensors detect motion, for instance, only above a certain height (e.g., the approximate height of the chest or shoulders of an average person), the person's hands go undetected if they enter the danger zone below that height threshold.

Various additional features may further increase safety and/or operational efficiency. In some embodiments, the shape and materials of the robot (in particular, its appendages) are selected so as to maximize the highest permissible speed (i.e., the higher speed limit) that still avoids injury in case of a collision with a person's arm or hands. For example, the edges and/or corners of the robot's appendages may be rounded or padded with a soft material, and robot surfaces may similarly be covered with a soft material to minimize the impact forces in case of a collision. The robot may also include a collision-detection system such that halts the robot's motion upon a collision so as to avoid further collisions. Moreover, in some embodiments, the robot signals its internal state and intentions (i.e., the actions it plans to take next, such as movement in a particular direction) in an intuitive manner, allowing humans to gauge what the robot is going to do next and, thus, avoid collisions with a robot as easily as they can avoid collisions with another person. The robot safety system may also provide feedback to nearby persons to help them assess how their presence and actions affect robot operation, and thus enable them to adjust their actions to maximize robot performance. For example, a person may be alerted (e.g., visually or audibly) of his presence in the danger zone, which results in slowed-down robot operation, and the person may in response leave the danger zone if feasible.

In various embodiments, the robot is equipped with one or more touch-based or mechanical controls in places that can easily and safely be reached by a human from outside the zone of danger, allowing a person to switch the robot into training mode by touching or activating any of these controls. In training mode, the person may enter the zone of danger in order to instruct the robot in the performance of certain tasks, typically via direct physical interactions (e.g., by guiding the robot's appendage). To render the training mode safe, the robot moves only in response to a command from the user to do so, and in that case it moves at speeds not exceeding the lower speed limit (or even at or below a third, still lower speed limit) until it determines that the user has moved sufficiently far away from the robot.

Finally, the robot's safety system may implement self-consistency checks to monitor its safety sensors and ensure that all sensors are operating correctly; if it detects a failure, the safety system shuts down robot operation. To ensure safe shut-down in case of a power failure, the robot may have additional capabilities to passively lower its arms in a slow and safe manner, avoiding any possibility of injury to a person.

Accordingly, in a first aspect, the invention is directed to a robot including a body and one or more appendages attached to and movable with respect to the body, and a sensor system for detecting persons within a detection zone around the robot. One or more corners or edges of the appendage(s) may be rounded or padded with a soft material. The sensor system may include one or more sonar sensors. Alternatively or additionally, the sensor system may include one or more cameras and an associated image-processing facility, which may be configured to discriminate between a person's torso or head and the person's arms. The robot further includes a computational facility for (i) defining a danger zone at least partially within the detection zone, (ii) operating the robot at a speed at or below a first threshold at which collisions between the appendages and a person's arms do not harm the person, and (iii) in response to detection of a person's torso or head within the danger zone, operating the robot at a speed at or below a second threshold at which collisions between the at least one appendage and the person's torso or head do not harm the person, the second threshold being lower than the first threshold. The robot may also include a switching mechanism operable by a person to switch the robot into training mode; the computational facility may be configured to operate the robot, when switched into training mode, at a speed at or below a third threshold below the first threshold and, preferably, below the second threshold. The computational facility may be, at least partially, embedded in the robot's body or appendages (or other physical robot parts), or provided in a separate device in communication with the robot.

The boundary of the danger zone may be based, at least in part, on a reach of the appendage(s); in some embodiments, the danger zone is co-extensive with the reach of the appendage(s), whereas in other embodiments, its outer boundary lies beyond the reach of the appendage(s) by a margin of safety. In various embodiments, at least a portion of the danger zone is outside the detection zone. The detection zone may be spatially limited by a lower height boundary such that activity within the danger zone below the detection zone does not alter operation of the robot; the lower height boundary may vary with distance from the robot.

The robot may further include one or more output devices for signaling a direction toward a location at which a robot action is going to take place, proximity of a human to the robot, an indication whether the robot has detected a person in the zone, and/or an indication of a robot malfunction. In addition, the robot may have a collision-detection system; and the computational facility may be responsive to the collision-detection system and terminate operation of the robot when a collision is detected. The robot may also include an emergency circuit for safely shutting down robot operation in case of a power failure.

In another aspect, the invention pertains to a method for safely operating a robot having at least one movable appendage. The robot is operated at a speed at or below a first threshold at which collisions between the appendage(s) and a person's arms do not harm the person. The method involves using a sensor system to monitor a detection zone around the robot to detect persons therein (e.g., based on the detection of motion); in response to detection of a person's torso or a person's head within a danger zone that is at least partially within the detection zone, the robot is operated the robot at a speed at or below a second threshold at which collisions between the at least one appendage and the person's torso or head do not harm the person, the second threshold being lower than the first threshold.

In some embodiments, at least a portion of the danger zone is outside the detection zone. The detection zone may be defined in part by a lower height boundary such that activity within the danger zone below the detection zone does not alter operation of the robot. Monitoring the detection zone may include or consist of acquiring images of the detection zone and processing the images so as to identify a person's torso or head therein. The method may further include switching the robot into training mode upon operation of a switching mechanism by a person, and operating the robot, when switched into training mode, at a speed at or below a third threshold, the third threshold being below the first threshold. Moreover, the method may involve terminating operation of the robot when a collision occurs and/or safely shutting down robot operation in case of a power failure.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1:
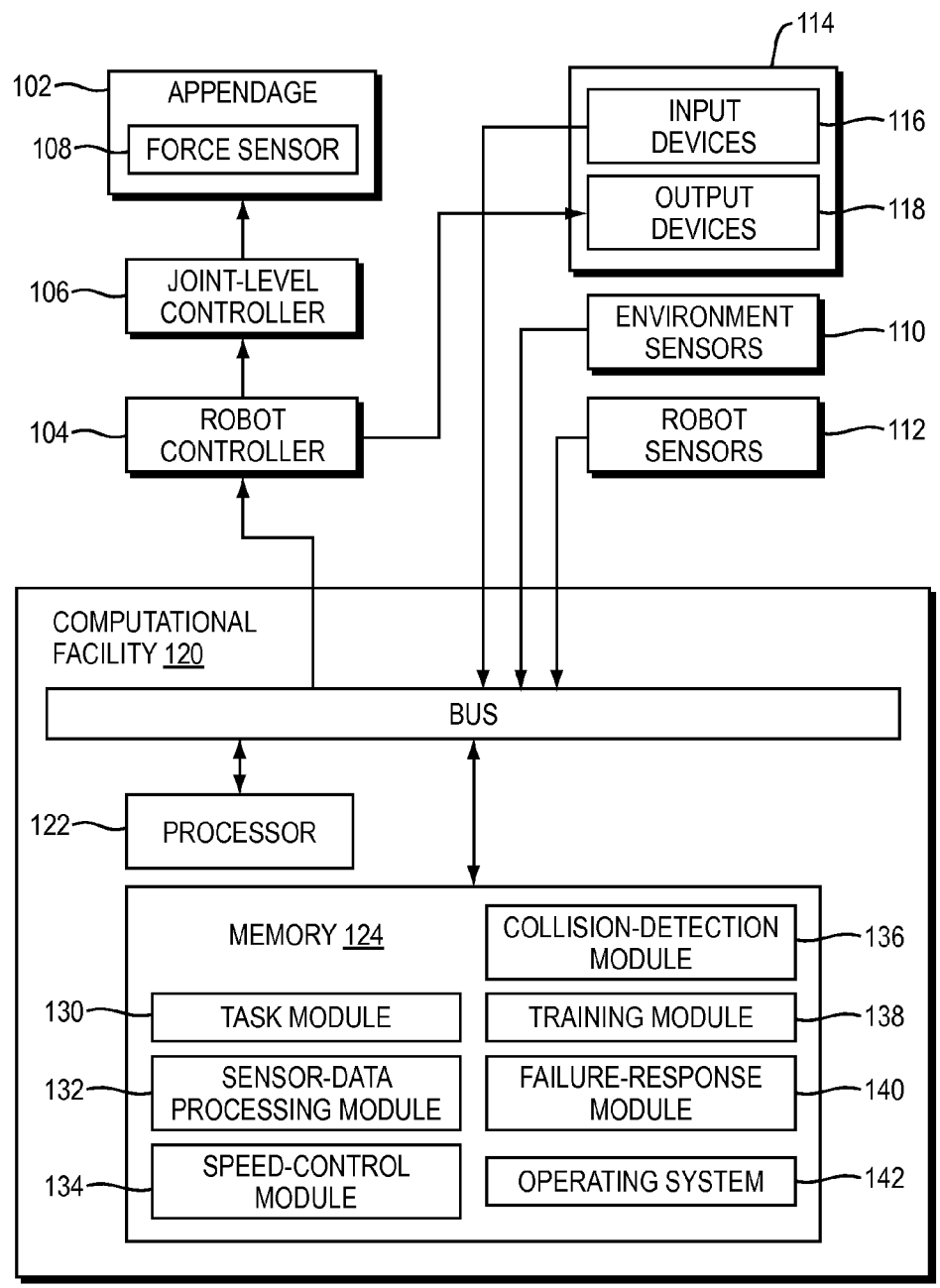
FIG. 1 is a block diagram conceptually illustrating the functional components of a robot in accordance with various embodiments.

FIG. 1 conceptually depicts the main functional system components of robots 100 that, in accordance with various embodiments, can safely share their workspace and/or collaborate with humans. Such a robot 100 generally includes one or more appendage(s) 102, each usually (but not necessarily) including multiple links connected via movable joints (such as hinges or rotary joints) and an end-effector (such as parallel dual-finger grippers, suction cup grippers, or multi-fingered dexterous hands) for manipulating and moving objects or performing other useful work. Movement of the appendage(s) 102 is controlled by one or more controllers, which generally include a higher-level robot controller 104 that monitors and alters robot positions, kinematics, dynamics, and forces, and, in communication with and accepting commands from the high-level controller 104, one or more joint-level controllers 106 that drive the individual motors and actuators associated with the joints to move the appendage(s) 102 or other moving parts of the robot as directed. The appendage(s) 100 may also have one or more integrated force sensors 108 that measure forces applied externally to the appendage (e.g., by a user when he guides a robot arm, or upon a collision with a person or object).

To monitor the space around the robot 100 and detect, e.g., people approaching the robot 100, the robot 100 further includes one or more sensors 110 for monitoring the robot's environment, such as, without limitation, sonar sensors, optical range sensors, one or more video cameras (preferably with depth-sensing capabilities and operating, e.g., in the visible or infrared regime), and/or microphones (e.g., for detecting people based on characteristic sound patterns). In addition, the robot may include sensors 112 for monitoring the state of the robot 100 itself, such as, e.g., accelerometers or gyroscopes to keep track of the location, orientation, and configuration of its appendage(s) 102. Further, the robot 100 typically includes a user interface 114 with one or more user-input devices 116 (such as, e.g., buttons, dials, or other mechanical control; touch pads; a keypad or keyboard for text entry, etc.) as well as output devices 118 that provide information to the user (such as, e.g., one or more screens, indicator lights, a speaker, etc.). User input provided via the user-input devices 116 and signals acquired with the sensors 110, 112 may be sent to and processed in a computational facility 120. Based on the sensor signals and user input in conjunction with, e.g., programs executed on the computational facility 120, the computational facility 120 directs the operation of the robot. The computational facility 120 may, for instance, communicate with, or include, the robot controller 104 and thereby govern robot movements. Furthermore, it may provide control signals and/or data to the output devices 118 (e.g., to turn indicator lights on or off, or to display text or images on a screen).

The computational facility 120 may be implemented in hardware, software, or a combination of both. In various embodiments, it includes at least a processor 122 and associated memory 124 as well as one or more buses 126 that facilitate communication therebetween and/or with the sensors 110, 112, robot controller 104, and user interface 114. For example, the computational facility 120 may be provided on a general-purpose computer including a CPU, system memory, non-volatile data storage devices, user input/output devices, and optionally interfaces or ports for connection to other devices. Alternatively, the computational facility 120 may employ any of a variety of other processing devices, including, without limitation, special-purpose computers, microcontrollers, application-specific integrated circuits (ASICs), field-programmable gate arrays (FPGAs), digital signal processors (DSPs), or programmable gate arrays (PGAs). In some embodiments, combinations of multiple different processing devices are used. The computational facility 120 may be physically embedded into the robot (e.g., integrated with the robot controller 104 into one device), or remotely communicate with the robot 100 via a wired or wireless connection (e.g., via Ethernet, Bluetooth, WLAN, the Internet, etc.). Furthermore, in some embodiments, the overall control functionality of the computational facility 120 and/or the robot controller 104 is distributed between components physically integrated into the robot, and external components in communication with the robot.

The functionality of the computational facility 120 may be organized into various modules (e.g., multiple discrete inter-communicating circuits, or multiple software applications or program modules stored, as illustrated, in the memory 124). For example, a task module 130 may control the robot to perform its work, e.g., in accordance with tasks that it has been programmed or trained to do. A sensor-data-processing module 132 may process sensor readings received from the sensors 110, 112 to, for instance, detect motion occurring in the environment of the robot, calculate ranges for any objects detected, and/or process images to identify and locate persons therein (and, optionally, distinguish between different body parts), depending on the type of sensor utilized. The processed sensor data may be utilized by a speed-control module 134 that determines, e.g., based on zone definitions stored in memory 124, when a person enters or leaves the zone of danger (with his head or torso), and switches between different maximum-speed settings accordingly. A collision-detection module 136 may monitor the robot for unexpected collisions (based, e.g., on signals from force sensors embedded in the robot and/or on the continuously updated self-model of the robot), and, in response to a collision, command the robot to immediately interrupt operation. A training module 138 may govern robot operation and process user input in a training mode that facilitates physical interactions between the robot 100 and a user, e.g., for training purposes. Finally, a failure-response module 140 may monitor the robot sensors 112 for mutual consistency of their readings, detect any sensor or robot-operation failures, and issue a warning, interrupt robot operation, and/or initiate a safe shut-down procedure in case of any failure condition. In some embodiments, the failure-response module 140 is powered by an emergency battery, and further controls safe shut-down in case of a power failure. In addition to these various modules specific to robot control in accordance herewith, the computational facility—if, e.g., provided by a general-purpose computer—may include a conventional operating system 142 (e.g., Gentoo Linux) that directs the execution of low-level, basic system functions such as memory allocation, file management and operation of mass storage devices. Of course, as will be readily understood by one of skill in the art, the different functionalities may be grouped into fewer or more modules or, generally, organized in many other ways. In general, if implemented in software, the various modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages; in some embodiments, different modules are programmed in different languages.

Figure 2A:
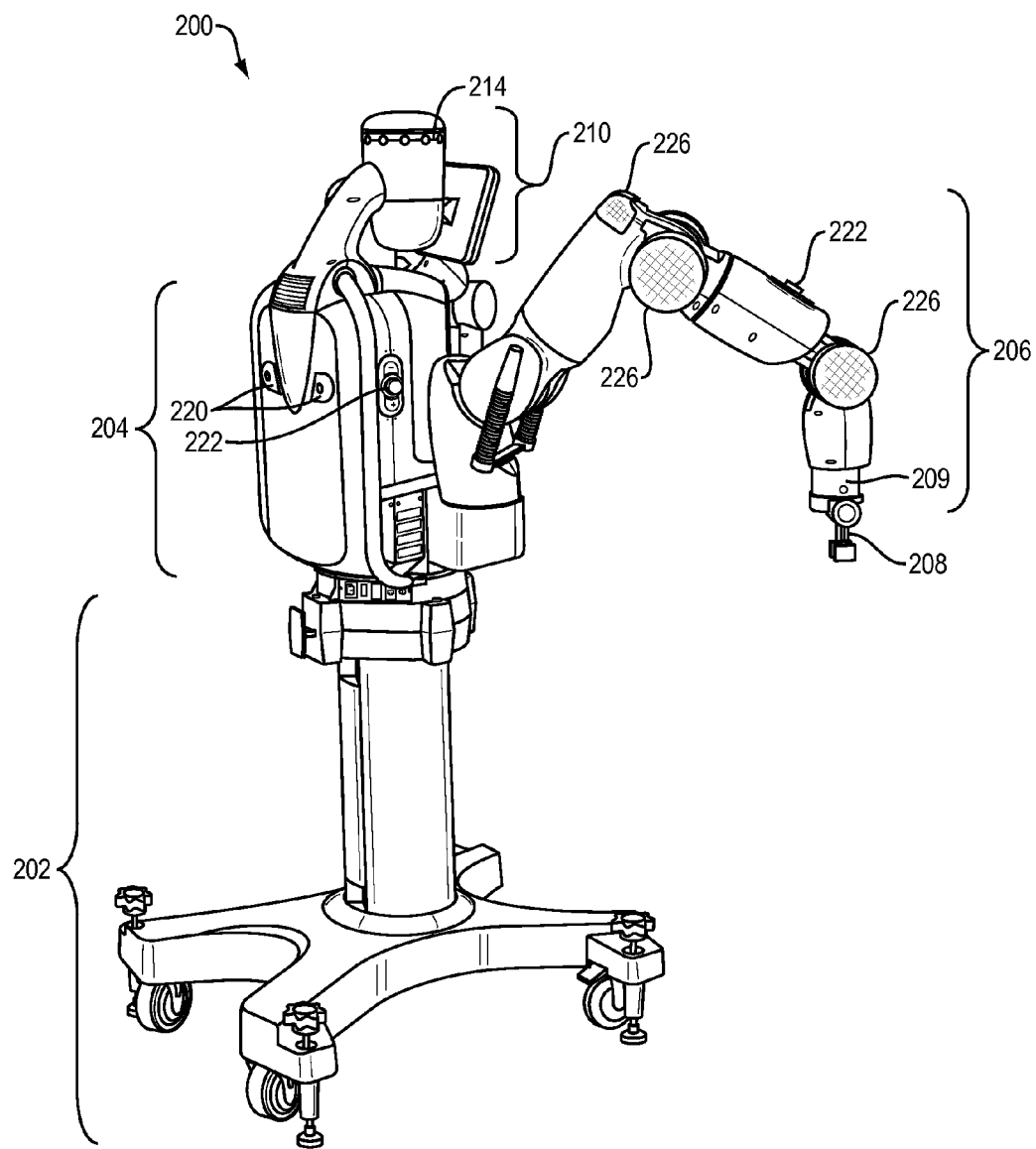
FIGS. 2A and 2B are perspective views of an exemplary robot in accordance with one embodiment.
Figure 2B:
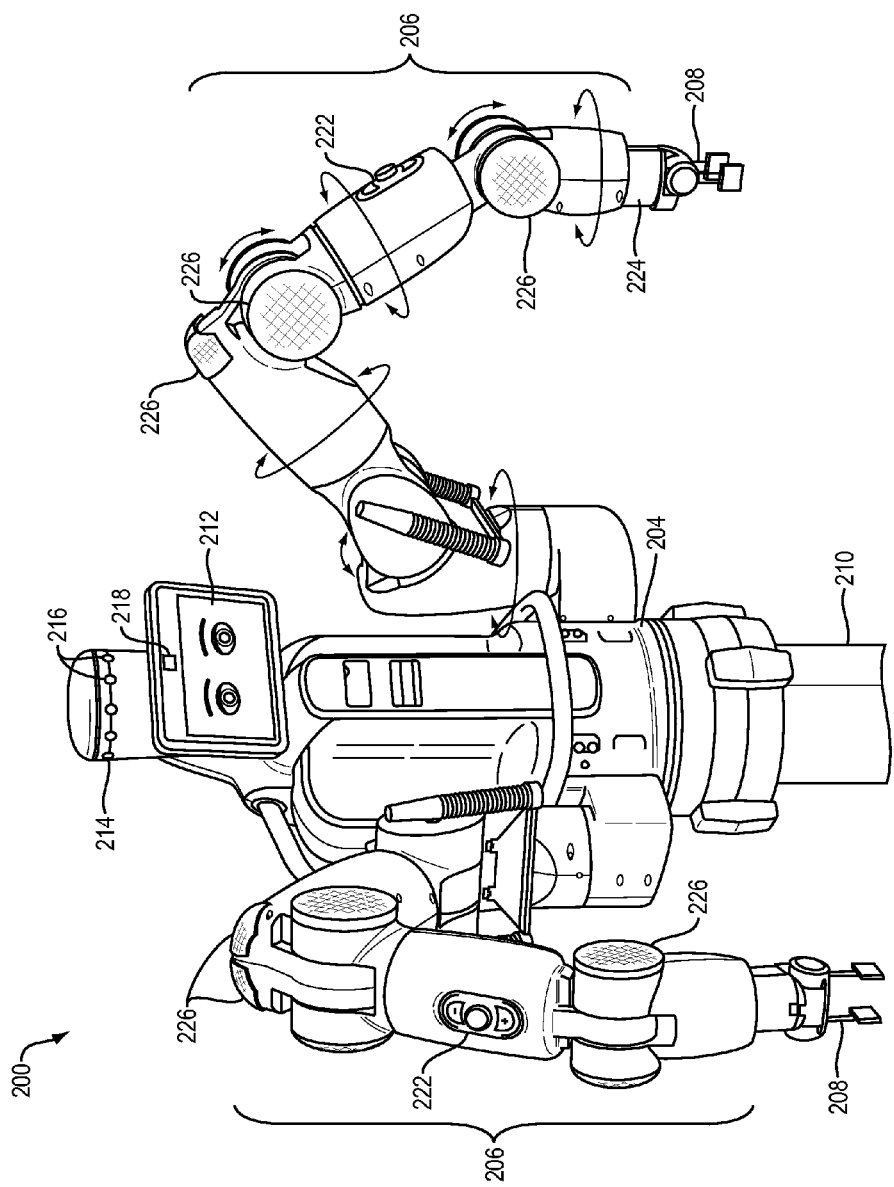

FIGS. 2A and 2B illustrates an exemplary robot 200 in accordance with one embodiment of the invention. The robot includes a (fixed or rollable) base 202, a body 204, two arms 206 with grippers 208 for manipulating objects, and a head 210 with an LCD screen 212. The LCD screen 212 can rotate around a vertical axis through the center of the head 210. It may display, alternately or simultaneously in different screen portions, text, still images or video frames captured by one of the robot's integrated cameras, or computer-generated graphics (such as a face). In state depicted in FIG. 2B, the screen displays eyes, which may indicate by the direction of their gaze in which direction the robot intends to move, or provide similar visual, intuitively understood cues to people.

Integrated into the head 210 is a sonar sensor ring 214 for detecting moving objects or people in the robot's environment; detecting moving rather than static objects helps to discriminate between persons and inanimate objects, as an object that stays completely still is very unlikely to be a person. The sonar ring 214 emits pulses of sound (in the infrasonic, audible, or ultrasonic range) and listens for echoes that result from reflections off objects in the environment. Based on the time of flight, i.e., the total round-trip time, of the acoustic signal, the distance of the object can be inferred. Further, the sonar ring 214 may comprise multiple individual emitter-sensors around its periphery, allowing the direction in which the object is detected to be ascertained. The (generally time-dependent) signals received by all the sensors may be processed collectively to detect and/or tracked motions, e.g., when a person moves from the detection zone (or "field of view") of one sensor into the detection zone of a neighboring sensor. To distinguish between people and other moving objects, speeds and patterns of motion are analyzed and compared against typical human motions in certain embodiments. The sonar ring also includes indicator lights 216 that indicate in which direction a person has been detected, which can serve as feedback to the detected and other persons and may, e.g., prompt the detected person to move away from the robot until the indicator lights 216 turn off. Suitable arrangements for implementing these functions are set forth in copending application Ser. No. 13/159,047 ("Dual-motor series elastic actuator") and Ser. No. 13/440,653 ("Visual indication of target tracking"), the entire disclosures of which are hereby incorporated by reference.

Mounted above the screen 212 may be a camera 218 that monitors the robot's environment. In conjunction with suitable image-processing software (e.g., implemented in a computational facility 120 as depicted in FIG. 1), the camera 218 provides an alternative or complementary means for detecting people near the robot. In certain embodiments, image-based detection facilitates identifying humans without regard to their motion, e.g., based on their typical body size and shape, the unique features of faces, and/or typical skin colors. Furthermore, it may enable explicit discrimination between various body parts, such as the torso, head, arms, hands, and legs. Such detection, identification, and discrimination functionality may be provided by various conventional image-processing algorithms known to persons of skill in the art, including, without limitation, edge detection and other feature-recognition methods, correlation against image templates, principal component analysis, color/texture analysis, etc. The image-processing software may also track the detected human's motion, providing another way of discriminating between persons and still objects and allowing the robot to give the human an early warning, e.g., when he is about to enter the danger zone. The distance of a detected person from the robot may be determined in various ways. In one approach, the images are analyzed for human faces, from whose size the approximate range to the person can be inferred. Alternatively, distance may be computed from two images acquired by a stereo camera, or measured with any other kind of optical depth sensor. In various embodiments, sonar measurements and camera images are used in some combination to detect people in the robot's environment. For example, the sonar ring 214 may be used initially to detect movement, and face recognition techniques may be employed thereafter to confirm that the moving object is human. Of course, other types of motion and range sensors may be used as well to monitor the spatial region around the robot.

The robot 200 also includes a number of user interaction points: touch pads (or "attention buttons") 220 on the shoulders, which, when tapped by a human, indicate the location of the human to the robot and cause the robot to interrupt its action and slowly bring its arm 206 to the side where the person is standing; one or more "navigators" 222, i.e., sets of mechanical controls for providing user input to the robot; and touch-sensitive wrist cuffs 224 by which the user can grasp the robot's arms. Whenever a person touches any of these user interface components 220, 222, 224 the robot switches into training mode; in this mode, it will only move (and then only slowly) upon explicit request from the user. The training mode allows users to physically interact with the robot, e.g., so as to demonstrate the performance of various tasks to the robot. For instance, the user may grasp the robot's arm 206 by the wrist cuff 224 and guide it through certain motions for picking up, moving, or manipulating an object. Exemplary characteristics and operation of a robot in training mode are described, for example, in U.S. patent application Ser. No. 13/621,517 ("User Interface for Robot Training") and Ser. No. 13/621,657 ("Training and Operating Industrial Robots"), the entire disclosures of which are hereby incorporated by reference.

Instead of or in addition to user-manipulable controls embedded directly in the robot, the robot may also include a transceiver for communicating wirelessly via a remote control device, such as, e.g., a smartphone. For example, a smartphone application may allow the user to switch the robot into training mode (or turn it on or off) remotely, without any need for physical contact with the robot. In various environments, such remote-control functionality may provide a useful additional safety layer. On a manufacturing floor, for instance, people may generally interact with the robots via controls on the robot, but a supervisor may have a smartphone (or other remote control device) that allows him to remotely shut down a robot, or switch it into another mode, at any time if he perceives a danger. (A smartphone is a mobile phone with advanced computing ability that is, generally, capable of communicating via the internet, displaying web pages, and executing interactive applications that involve data exchange with a remote device. Smartphones include, for example, iPhones™ (available from Apple Inc., Cupertino, Calif.), BlackBerries™ (available from RIM, Waterloo, Ontario, Canada), or any mobile phones equipped with the Android™ platform (available from Google Inc., Mountain View, Calif.).)

As illustrated in FIGS. 2A and 2B, certain surfaces of the robot arms 206, and in particular their sharp corners, are covered with soft rubber pads 226 (or, generally, any kind of soft shock-absorbing or damping structure) that lessen the severity of any impacts that may occur. At any speed at which the robot can operate (which is always at or below the higher speed limit), the "soft" arms 206 do not cause injury when they hit a person. The robot arms 206, moreover, stop when they encounter an unexpected impact, so the duration of any collision is very limited. These two factors make it safe for a human to reach into the robot workspace with her arms when the robot is operating at full speed. On the other hand, when a person's torso or head gets within reach of the robot's arms 206, out of a sense of caution, the robot is slowed down to a very low speed (at or below the lower of the two speed limits) where impacts with the person's head do not cause any harm and are, generally, below the pain threshold.

In general, in accordance herewith, the lower speed limit is triggered when a person is detected entering a danger zone around the robot. The danger zone may be defined based on practical considerations concerning safety risks, which may be specific to the application—i.e., the type of robot, the type of tasks it carries out, and the environment in which it operates. For example, in some embodiments, the danger zone is co-extensive with spatial region around (and co-moving with) the robot in which collisions can occur; the outer limits of this region generally correspond to the reach of the robot's appendages (or other movable parts). In some embodiments, regions where collisions can at worst occur with non-moving (or very slowly moving) robot parts (e.g., the robot's body and head), but not with the appendages, are excluded from the danger zone if collisions with stationary parts are deemed harmless. In certain embodiments, e.g., where the robot as a whole generally moves, the danger zone may include a safety margin beyond the boundary of the collision region such that the lower speed limit for the appendages is triggered before the person comes within their reach. The depth of the safety margin may depend on the robot's overall speed of motion. As will be readily appreciated by persons of skill in the art, the danger zone may be defined in many different ways.

The danger zone lies at least partially within the detection zone, i.e., the zone monitored by (or "field of view" of) the sensor system. The detection zone is typically limited by a certain maximum range beyond which the sensor system cannot, or not reliably, detect people and/or motion; this range generally depends on the type of sensor system employed (e.g., sonar vs. image-based system). Further, regions immediately adjacent the robot may be excluded from the field of view of the sensor system (e.g., due to the sensors' position, orientation, and/or configuration and any obstructions presented by other robot parts) and, thus, fall outside the detection zone. As a result, portions of the danger zone may fall outside the detection zone. In some embodiments, the detection zone is deliberately tailored so as to exclude certain portions of the danger zone from coverage, as explained with respect to FIG. 3B below.

Figure 3A:
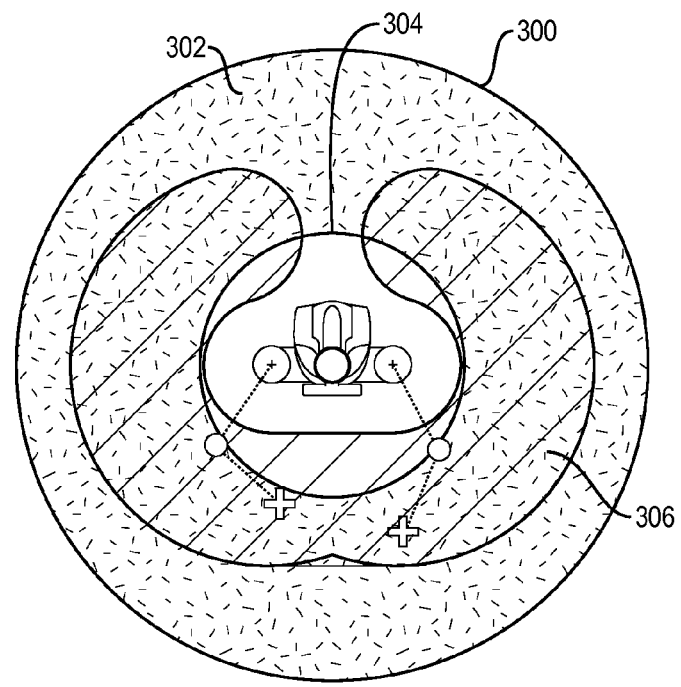
FIGS. 3A and 3B are a schematic top and perspective views illustrating the detection zone and the danger zone of a robot in accordance with various embodiments.
Figure 3B:
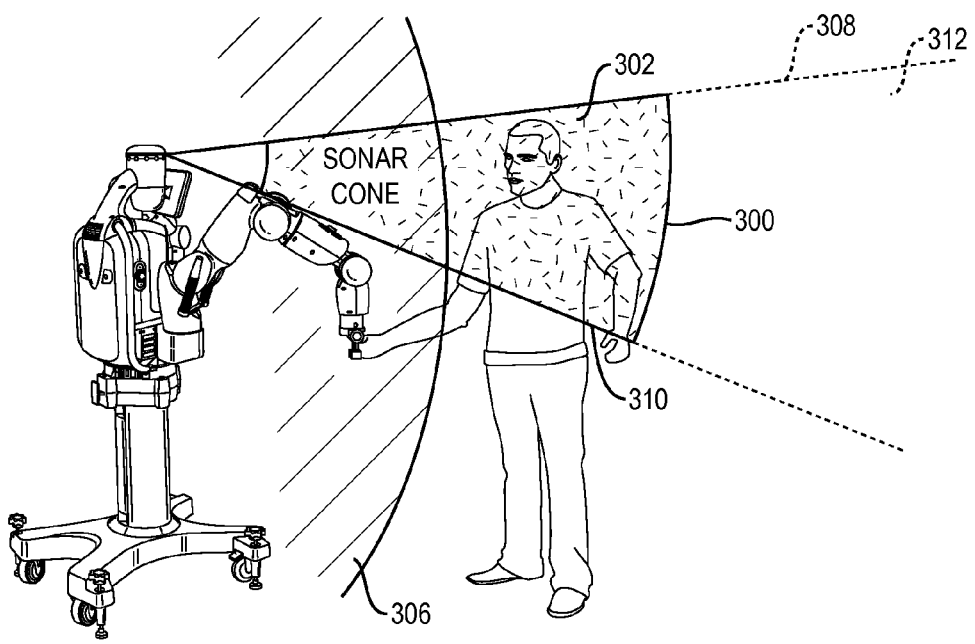

FIGS. 3A and 3B illustrate the detection zone and the danger zone for the robot 200 of FIGS. 2A and 2B in a plan view from above the robot 200 and in an elevational view from the side, respectively. As shown in FIG. 3A, an outer boundary 300 (which is circular in the depicted two dimensions) defines the outer limits of the detection zone 302 (i.e., the region in which the sonar system can reliably detect motion). An inner (likewise circular) boundary 304 defines the inner limits of the sonar detection zone 302; points within that boundary 304 are too close to the robot 200 for detection by the robot's sonar system. The kidney-shaped zone 306 defines the limit of the robot's reach with its arms and is, in this embodiment, co-extensive with the danger zone. As shown, the robot's arms cannot come arbitrarily close to the robot's body and head; the arms' reach is, instead, limited by a safety region surrounding the robot that serves to prevent self-collisions of the robot. This need not, of course, be the case in all embodiments. Furthermore, the danger zone may extend beyond the reach of the arms and include, for example, regions where collisions with the robot's body or head can occur. Thus, the danger zone may be a solid spatial region (e.g., a sphere or semi-sphere) defined by a single closed boundary enclosing the robot, a shell of a certain thickness formed between inner and outer (e.g., spherical) boundaries, or—as shown—an irregular shaped spatial region surrounding, but not fully enclosing, the robot.

FIG. 3B shows a person interacting with the robot 200, and illustrates the vertical extent of the detection zone 302. The detection zone 302 may have upper and lower boundaries 308, 310 formed by the sonar beams 312 emitted by the individual emitter-sensors of the sonar ring 214; these beams 312 may be substantially conical in shape, resulting in a toroidal detection zone around the robot. The sonar sensors are oriented such that the lower boundary 310 of the detection zone rises with decreasing distance to the robot, and are positioned such that a person's body and head (e.g., the body and head of an adult of about average size standing upright) can be detected anywhere in the detection zone 302. If a person is detected in a portion of the detection zone that coincides with the danger zone 306, the robot 200 responds by slowing down its movements. When a person is detected outside the danger zone, however, the robot continues operating at normal (e.g., full) speed. The robot's speed is, thus, controlled not only based on whether a person is detected at all, but also based on where any detected person is located and, in particular, based on her distance from the robot 200 (as determined, e.g., using time-of-flight measurements or other depth-sensing approaches as described above). As shown in FIG. 3B, a person just outside the danger zone 306 is usually able to reach a hand or arm into the danger zone 306 below the lower boundary 310 of the sonar detection region, and, thus, to interact with the robot 200 and/or operate in the robot's workspace without triggering the lower speed limit. Accordingly, by virtue of the sonar sensor arrangement and the resulting shape of the detection zone, discrimination between a person's head and upper body and his hands is achieved incidentally to detection. In embodiments where people are detected based on camera images, the toroidal detection zone 302 of the sonar ring may be simulated deliberately, and the lower speed limit triggered only when a moving object found in the zone of danger extends above shoulder height. Alternatively, discrimination between a person's torso and his hands can be accomplished based on shape and size, e.g., so as to cause a switch to lower speeds when a large, approximately cylindrical object (like a torso) is detected.

Figure 4:
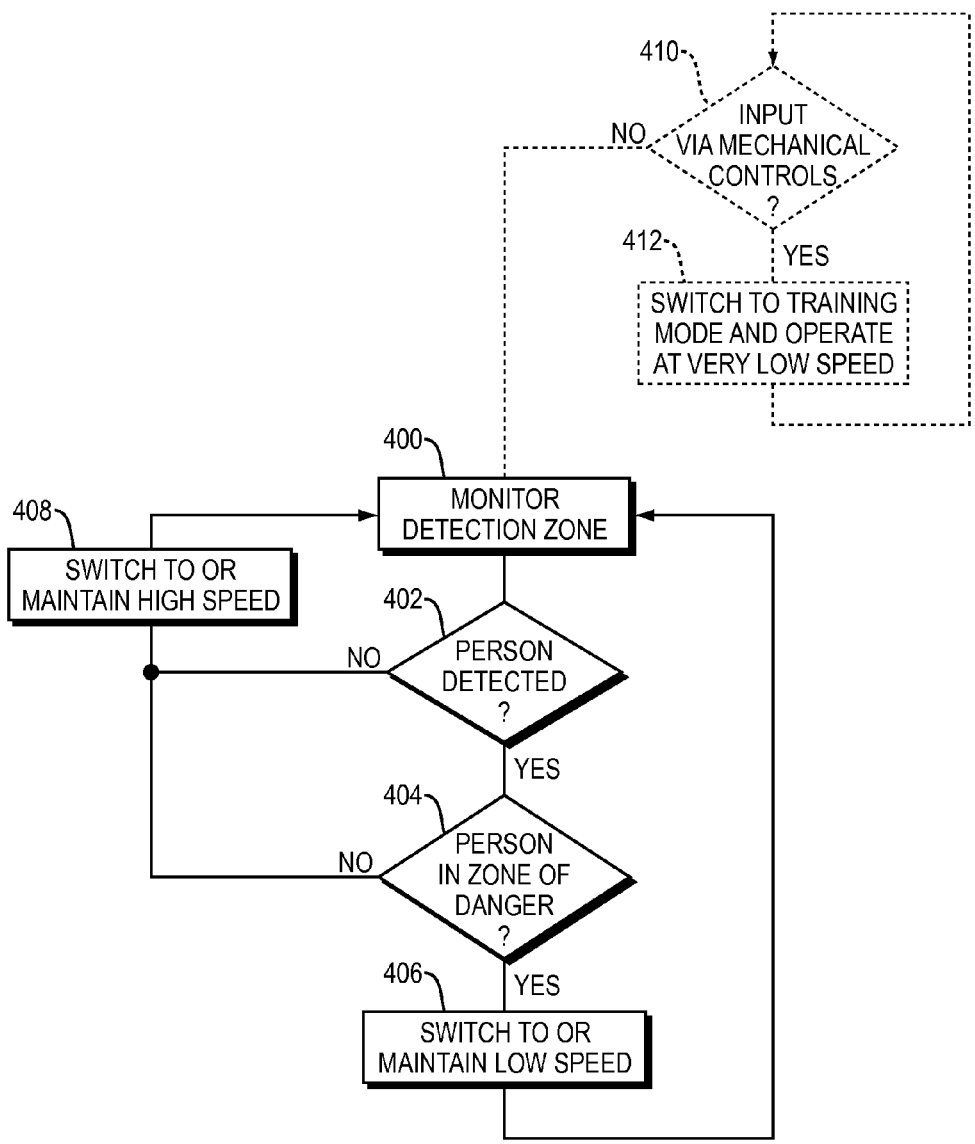
FIG. 4 is a flow chart illustrating methods for monitoring a zone around the robot and switching between robot speed limits based thereon in accordance with various embodiments.

FIG. 4 summarizes methods in accordance with various embodiments for controlling the speed settings of a robot to ensure safety in spaces where the robot works with or alongside humans. These methods involve continuously monitoring a detection zone around the robot (step 400) (e.g., with a sonar ring 114 or other sensors 110 in conjunction with a sensor-data processing module 132) to detect people therein, for instance, based on their motion (step 402). Once a person has been detected, a determination is made (e.g., by processing module 132) whether that person—or, precisely, her torso or head—is located in the zone of danger (step 404). If the person is within the zone of danger, the robot's maximum speed limit is switched to (or remains at) the lower of speed settings (step 406); otherwise, it remains at the higher setting (step 408). Of course, when the robot operates at the lower speed and the person then leaves the zone of danger, the speed limit is switched back to the higher setting (step 408). In some embodiments, a third, even lower speed setting is used in training mode; that is, when the robot receives user input via any of the mechanical controls on its body (e.g., controls 220, 222, 224) (step 410), which may occur with the person's torso and head in or outside the zone of danger, the robot switches into a mode in which it operates at very low speeds and, typically, only in direct response to user input. This control scheme facilitates seamless switching between a robot working independently (at the highest speed), working collaboratively with a human (at a lower speed), and interacting with a human in training mode (at the lowest speed).

In some embodiments, the robot can give various visual cues to any person who is nearby. For example, the face rendering on the screen 212 may include representations of eyes that a person can use to estimate an indicated gaze direction. The robot may change its gaze to a direction in which it is about to move, or to a location where it is going to carry out the next action. For instance, if the robot is going to reach for an object, its rendered eyes may first gaze at the site to which it will move its arm. Once the robot has an object in its gripper, it may shift its gaze to the place where it will put that object. In this way, the person can predict the robot's next actions. Since the robot is programmed to mimic how humans would move their eyes in similar circumstance, there is generally no need to train the observing human in the interpretation of the robot's eyes—people can intuitively understand what the robot means when shifting its gaze. In addition to using the eyes for signaling intentions, the robot's face as a whole may also provide important visual cues. For example, the robot's face may turn red whenever a person is detected in the zone of danger, providing an intuitive warning.

The sonar sensor ring 214 may also double as a visual indicator, as it may include a ring of yellow lights spaced around the circumference of the robot's head. The lights light up in any direction where the system has detected motion, whether the motion be detected by the sonar ring itself or, e.g., by a face-detection algorithm running on an image stream from the robot's head camera 218. The lights indicate to the person whether the robot can "see" her. The robot may, further, include a solid ring of light, or "halo," on its head that changes color and/or blinks in case of a robot malfunction, e.g., from green (indicating normal operation) to red. This color change gives people an intuitive warning that something is wrong with the robot. The halo may also provide more detailed information about the robot's state. For example, in one embodiment, a solid green halo indicates that the robot is working normally; flashing green means that it is in training mode; solid yellow (with all sonar lights simultaneously flashing yellow so that color-blind people can see the difference from solid green for the halo) indicates that the robot is confused and will not move until it gets assistance; very slow pulsing yellow (e.g., with pulse durations of six seconds each) means that the robot is sleeping (and, thus, not about to move); and fast-flashing red signals that the robot is broken and not going to move for that reason.

When the robot does experience a malfunction, its internal safety behaviors ensure that it shuts down safely. Problems may be detected, for example, based on sensor readings from the sensors 112 that monitor the operation of the robot. The readings from different sensors may be checked for mutual consistency—within certain ranges of tolerance—based on constraints that describe physical relationships between the various measured quantities that hold during ordinary robot operation. Violations of any of these constraints indicates sensor failure, unusual and problematic robot behavior, or both, and may trigger the initiation of a safety protocol, such as automatic shut-down or at least a temporary halt of robot operation. (Sensor consistency checks and suitable responses are described in detail in U.S. patent application Ser. No. 14/012,389, filed on Aug. 28, 2013, which is hereby incorporated herein in its entirety.) The robot is also stopped in case a collision is detected; in various embodiments, collision detection relies on measurements by force sensors embedded in the appendages. Shut-down or temporary interruption of robot operation generally involves disabling the joints, and may be accomplished by cutting off power going into the motors of the joints, by shortening the coils in the motor to provide dynamic braking that dissipates mechanical energy in the robot limbs utilizing electro-mechanical damping effects, or by actively braking the system to a zero-velocity state. In case of a power failure, an electronic emergency-stop braking circuit for the robot's arms 102 causes them to lower slowly, e.g., by short-circuiting one or more motor windings; the braking circuit may be powered, e.g., by a charge-storage circuit. Suitable circuitry is described, e.g., in U.S. patent application Ser. No. 13/446,650 filed on Apr. 13, 2012 ("Electronic Emergency-Stop Braking Circuit for Robotic Arms"), which is hereby incorporated herein by reference in its entirety.

While the invention has been described with respect to particular features and embodiments, it will be apparent to those of ordinary skill in the art that other embodiments incorporating the concepts disclosed herein may be used without departing from the spirit and scope of the invention. For example, the robot may include alternative or additional sensors or sensor locations and arrangements than described above for detecting the presence and location of humans. Further, the robot may communicate the detection of persons and its intentions in manners other than those described, including, e.g., by sound. Accordingly, the described embodiments are to be considered in all respects as only illustrative and not restrictive.

What is claimed is:

1. A robot comprising:
   a body and, attached thereto, at least one appendage movable with respect thereto;
   a sensor system for detecting persons within a detection zone around the robot; and
   a computational facility for (i) defining a danger zone at least partially within the detection zone, (ii) operating the robot at a speed at or below a first threshold at which collisions between the at least one appendage and a person's arms do not harm the person, and (iii) in response to detection of at least one of a person's torso or head within the danger zone, operating the robot at a speed at or below a second threshold at which collisions between the at least one appendage and the person's torso or head do not harm the person, the second threshold being lower than the first threshold.

2. The robot of claim 1, wherein at least a portion of the danger zone is outside the detection zone.

3. The robot of claim 1, wherein a boundary of the danger zone is based at least in part on a reach of the at least one appendage.

4. The robot of claim 3, wherein the detection zone is spatially limited by a lower height boundary such that activity within the danger zone below the detection zone does not alter operation of the robot.

5. The robot of claim 4, wherein the lower height boundary varies with distance from the robot.

6. The robot of claim 1, wherein the sensor system comprises at least one sonar sensor.

7. The robot of claim 1, wherein the sensor system comprises at least one camera and an associated image-processing facility.

8. The robot of claim 7, wherein the image-processing facility is configured to discriminate between the person's torso or head and the person's arms.

9. The robot of claim 1, wherein at least one of a corner or an edge of the at least one appendage is at least one of rounded or padded with a soft material.

10. The robot of claim 1, further comprising at least one output device for signaling at least one of a direction toward a location at which a robot action is going to take place, proximity of a human to the robot, an indication whether the robot has detected a person in the zone, or an indication of a robot malfunction.

11. The robot of claim 1, further comprising a switching mechanism operable by a person to switch the robot into training mode, the computational facility being configured to operate the robot, when switched into training mode, at a speed at or below a third threshold below the first threshold.

12. The robot of claim 1, further comprising a collision-detection system, the computational facility being responsive to the collision-detection system and terminating operation of the robot when a collision is detected.

13. The robot of claim 1, further comprising an emergency circuit for safely shutting down robot operation in case of a power failure.

14. A method for safely operating a robot having at least one movable appendage, the method comprising:
   operating the robot at a speed at or below a first threshold at which collisions between the at least one appendage and a person's arms do not harm the person;
   using a sensor system, monitoring detection zone around the robot to detect persons therein;
   in response to detection of at least one of a person's torso or a person's head within a danger zone that is at least partially within the detection zone, operating the robot at a speed at or below a second threshold at which collisions between the at least one appendage and the person's torso or head do not harm the person, the second threshold being lower than the first threshold.

15. The method of claim 14, wherein at least a portion of the danger zone is outside the detection zone.

16. The method of claim 14, wherein the detection zone is defined in part by a lower height boundary such that activity within the danger zone below the detection zone does not alter operation of the robot.

17. The method of claim 14, wherein monitoring the detection zone comprises detecting motion therein.

18. The method of claim 14, wherein monitoring the detection zone comprises acquiring images thereof and processing the images so as to identify a person's torso or head therein.

19. The method of claim 14, further comprising switching the robot into training mode upon operation of a switching mechanism by a person, and operating the robot, when switched into training mode, at a speed at or below a third threshold, the third threshold being below the first threshold.

20. The method of claim 14, further comprising terminating operation of the robot when a collision occurs.

21. The method of claim 14, further comprising safely shutting down robot operation in case of a power failure.

* * * * *